(12) United States Patent
Paladugu et al.

(10) Patent No.: US 12,108,494 B2
(45) Date of Patent: Oct. 1, 2024

(54) UE-TO-NETWORK RELAY SUPPORT FOR N3IWF ACCESS

(71) Applicant: QUALCOMM Incorporated, San Diego, CA (US)

(72) Inventors: Karthika Paladugu, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 640 days.

(21) Appl. No.: 17/146,293

(22) Filed: Jan. 11, 2021

(65) Prior Publication Data

US 2021/0219385 A1 Jul. 15, 2021

Related U.S. Application Data

(60) Provisional application No. 62/960,591, filed on Jan. 13, 2020.

(51) Int. Cl.
*H04W 88/04* (2009.01)
*H04W 4/14* (2009.01)
(Continued)

(52) U.S. Cl.
CPC ............ *H04W 88/04* (2013.01); *H04W 4/14* (2013.01); *H04W 8/005* (2013.01); *H04W 76/14* (2018.02)

(58) Field of Classification Search
None
See application file for complete search history.

(56) References Cited

U.S. PATENT DOCUMENTS

2017/0318480 A1* 11/2017 Karandikar ........ H04B 7/18558
2018/0270781 A1* 9/2018 Baek ..................... H04W 60/06
(Continued)

FOREIGN PATENT DOCUMENTS

CN 110199533 A 9/2019
WO 2018128505 A1 7/2018
(Continued)

OTHER PUBLICATIONS

Interdigital Inc: "Evaluation and Interim Conclusion for Key Issue #3", 3GPP Draft, SA WG2 Meeting #141E (e-meeting), S2-2007731, 3rd Generation Partnership Project (3GPP), Mobile Competence Centre, 650, Route Des Lucioles, F-06921, Sophia-Antipolis Cedex, France, vol. SA WG2, No. E (e-meeting), Oct. 12, 2020-Oct. 23, 2023, Oct. 2, 2020 (Oct. 2, 2020), XP051938761, 7 pages, Retrieved from the Internet: URL: https://ftp.3gpp.org/tsg_sa/WG2_Arch/TSGS2_141e_Electronic/Docs/S2-2007731.zip S2-2007731.docx [retrieved on Oct. 2, 2020] p. 1-p. 7.
(Continued)

*Primary Examiner* — Jinsong Hu
*Assistant Examiner* — Alexander J Yi
(74) *Attorney, Agent, or Firm* — Arun Swain

(57) ABSTRACT

Aspects of the disclosure relate to relaying data between a PC5 remote UE and a network entity (e.g., 5G core network entity) via an inter-working function (e.g., N3IWF) over sidelink UE-to-NW relay access. In an example operation, a relay UE establishes a connection with the network entity and determines whether relay access to the network entity via an inter-working function device is supported at the relay UE. The relay UE then indicates, to the remote UE, support of the relay access to the network entity via the inter-working function device. The relay UE receives, from the remote UE, a request to relay data between the remote UE and the network entity via the inter-working function device,
(Continued)

and thereafter, relays the data between the remote UE and the network entity via the inter-working function device based on the request. Other aspects and features are also claimed and described.

30 Claims, 12 Drawing Sheets

(51) Int. Cl.
*H04W 8/00* (2009.01)
*H04W 76/14* (2018.01)

(56) References Cited

U.S. PATENT DOCUMENTS

| | | | |
|---|---|---|---|
| 2019/0053104 A1* | 2/2019 | Qiao | H04W 28/24 |
| 2020/0178343 A1* | 6/2020 | Kim | H04W 76/27 |
| 2021/0127343 A1* | 4/2021 | Mladin | H04W 76/14 |

FOREIGN PATENT DOCUMENTS

| | | |
|---|---|---|
| WO | WO-2019031865 A1 | 2/2019 |
| WO | 2019121497 A1 | 6/2019 |
| WO | WO-2020010088 A1 | 1/2020 |

OTHER PUBLICATIONS

International Search Report and Written Opinion—PCT/US2021/013107—ISA/EPO—Apr. 29, 2021.
QUALCOMM Incorporated, et al., "KI#3, Sol#23: Update N3IWF Selection for Layer-3 UE-to-Network Relay", 3GPP Draft, SA WG2 Meeting #140E (e-meeting), S2-2008282, 3rd Generation Partnership Project (3GPP), Mobile Competence Centre; 650, Route Des Lucioles; F-06921 Sophia-Antipolis Cedex; France, vol. SA WG2, No. E (e-meeting), Elbonia, Aug. 19, 2020-Sep. 1, 2020, Oct. 25, 2020 (Oct. 25, 2020), 9 Pages, XP051948347, Retrieved from the Internet: URL: https://ftp.3gpp.org/tsg_sa/WG2_Arch/TSGS2_141e_Electronic/Docs/S2-2008282.zip S2-2008282 was 7689r04-pCR N3IWF selection for L3 UE-to-NW relay.doc, [retrieved on Oct. 25, 2020], p. 1-p. 9, the whole document.
QUALCOMM Incorporated: "KI#3, Sol#23: Update N3IWF Selection for Layer-3 UE-to-Network Relay," 3GPP Draft, Sa WG2 Meeting #140E (e-meeting), S2-2007689, 3rd Generation Partnership Project (3GPP), Mobile Competence Centre, 650, Route Des Lucioles, F-06921, Sophia-Antipolis Cedex, France, vol. SA WG2, No. E (e-meeting), Aug. 19, 2020-Sep. 1, 2020, Oct. 2, 2020 (Oct. 2, 2020), XP051938719, 8 pages, Retrieved from the Internet: URL:https://ftp.3gpp.org/tsg_sa/WG2_Arch/TSGS2_141e_Electronic/Docs/S2-2007689.zip S2-2007689-pCR N3IWF selection for L3 UE-to-NW relay-r0.doc [retrieved on Oct. 2, 2020] p. 1-p. 8.
QUALCOMM Incorporated: "Modifications to Solution#6: Layer-3 UE-to-Network Relay," 3GPP Draft, SA WG2 Meeting #136AH, S2-2000574, 3rd Generation Partnership Project (3GPP), Mobile Competence Centre, 650, Route Des Lucioles, F-06921, Sophia-Antipolis Cedex, France, vol. SA WG2, No, Incheon, Korea, Jan. 13, 2020-Jan. 17, 2020, Jan. 7, 2020 (Jan. 7, 2020), XP051842632, 4 pages, Retrieved from the Internet: URL: https://ftp.3gpp.org/tsg_sa/WG2_Arch/TSGS2_136AH_Incheon/Docs/S2-2000574.zip S2-20005747-modifications to end-to-end security in L3 Ue-to-NW relay soln.doc [retrieved on Jan. 7, 2020], p. 1-p. 4, the whole document.
QUALCOMM Incorporated: "Solution to Support End-to-End Security for Layer-3 UE-to-Network Relay", 3GPP Draft, SA WG2 Meeting #136AH, S2-2000575, 3rd Generation Partnership Project (3GPP), Mobile Competence Centre, 650, Route Des Lucioles, F-06921 Sophia-Antipolis Cedex, France, vol. SA WG2, No. Incheon, Korea, Jan. 13, 2020-Jan. 17, 2020, Jan. 7, 2020 (Jan. 7, 2020), XP051842633, 5 pages, Retrieved from the Internet: URL: https://ftp.3gpp.org/tsg_sa/WG2_Arch/TSGS2_136AH_Incheon/Docs/S2-2000575.zip S2- 2000575-pCR TR 23.752 N3IWF support for end-to-end security in L3 UE-to-NW relay soln.doc [retrieved on Jan. 7, 2020] sections 1-2 and 6.x-6.x.4, p. 1-p. 5.

* cited by examiner

UE-TO-NETWORK RELAY SUPPORT FOR N3IWF ACCESS

CROSS-REFERENCE TO RELATED APPLICATIONS

This application claims priority to and the benefit of U.S. Provisional Application Ser. No. 62/960,591 entitled "UE-TO-NETWORK RELAY SUPPORT FOR N3IWF ACCESS" filed on Jan. 13, 2020, the entire contents of said application are incorporated herein by reference as if fully set forth below in its entirety and for all applicable purposes.

TECHNICAL FIELD

The technology discussed below relates generally to wireless communication systems, and more particularly, to relaying data between a PC5 remote UE and a network entity (e.g., 5G core network entity) via an inter-working function (e.g., N3IWF) over sidelink UE-to-network relay access.

INTRODUCTION

Non-3GPP access networks may be connected to a 5G core network via a non-3GPP inter-working function (N3IWF). The N3IWF interfaces to 5G core network control-plane functions and user-plane functions via an N2 interface and an N3 interface, respectively.

A proximity service (ProSe) PC5 remote user equipment (UE) with UE-to-network (NW) relay access may connect to the 5G core network (5GC) via an inter-working function (e.g., N3IWF). Specifically, layer 3 (L3) UE-to-NW relaying may be implemented to support relaying for a remote UE as part of a system enhancement for Proximity based Services (ProSe) in a 5G System (5GS). In such systems, the ProSe 5G UE-to-NW relay UE may provide functionality to support connectivity to the network for remote UEs by relaying the remote UEs' user plane (UP) traffic to a gNB/5GC.

In one implementation, a remote UE may configure a non-access stratum (NAS) connection with the 5GC via an N3IWF. A UE-to-NW relay over PC5 may be another access type connected to the N3IWF. In another aspect, Access Traffic Steering, Switching and Splitting (ATSSS) may be implemented at a remote UE. For instance, the remote UE NAS may message for ATSSS support carried via N3IWF to the 5GC.

In one implementation, a remote UE may discover an inter-working function while connected to a relay UE over a sidelink interface. The remote UE may further establish a non-access stratum (NAS) connection with a network entity using the signaling IPsec security association established (via Internet Key Exchange (IKE) Security Association (SA) procedures) with the inter-working function, similar to untrusted non-3GPP access via N3IWF. The remote UE may further communicate, with the network entity via the relay UE, by sending the data over the IPsec Child SAs established with the inter-working function for the corresponding protocol data unit (PDU) sessions.

In another implementation, a relay UE may receive at least one relay discovery parameter from a network entity. The relay UE may further discover, based at least on the at least one relay discovery parameter, an inter-working function while connected to a remote UE over a sidelink interface. The relay UE may further establish, for the remote UE and based at least on an address of the inter-working function, a single relay PDU session or a dual relay PDU session corresponding to two PDU sessions for each relay service.

In another implementation, a remote UE may determine satisfaction of a service continuity condition over a radio interface or a sidelink interface while connected to a network entity via a relay UE. The remote UE may further establish a multi-access protocol data unit (MA-PDU) session via at least one of the radio interface or an IWF. The remote UE may further communicate, with the network entity via the relay UE, data via the radio interface or the inter-working function.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure relate to relaying data between a remote UE and a network entity via a non-3GPP inter-working function (N3IWF). In one example, a method of wireless communication at a relay user equipment (UE) is disclosed. The method includes establishing a connection with a network entity, determining whether sidelink relay access to the network entity via an inter-working function device is supported at the relay UE, indicating, to a remote UE, support of the sidelink relay access to the network entity via the inter-working function device, receiving, from the remote UE, a request to relay data between the remote UE and the network entity via the inter-working function device, and relaying the data between the remote UE and the network entity via the inter-working function device based on the request.

In another example, a relay user equipment (UE) for wireless communication is disclosed. The relay UE includes at least one processor, a transceiver communicatively coupled to the at least one processor, and a memory communicatively coupled to the at least one processor. The at least one processor is configured to establish a connection with a network entity, determine whether sidelink relay access to the network entity via an inter-working function device is supported at the relay UE, indicate, to a remote UE, support of the sidelink relay access to the network entity via the inter-working function device, receive, from the remote UE, a request to relay data between the remote UE and the network entity via the inter-working function device, and relay the data between the remote UE and the network entity via the inter-working function device based on the request.

In one example, a method of wireless communication at a remote user equipment (UE) is disclosed. The method includes receiving an indication from a relay UE that sidelink relay access to a network entity via an inter-working function device is supported at the relay UE, determining that data is to be communicated between the remote UE and the network entity via the inter-working function device, sending a request to the relay UE to relay the data between remote UE and the network entity via the inter-working function device, receiving, from the relay UE, a response indicating that the sidelink relay access to the network entity via the inter-working function device is available, and communicating, through the relay UE, the data between the remote UE and the network entity via the inter-working function device when the sidelink relay access via the inter-working function device is available.

In another example, a remote user equipment (UE) for wireless communication is disclosed. The remote UE includes at least one processor, a transceiver communicatively coupled to the at least one processor, and a memory communicatively coupled to the at least one processor. The at least one processor is configured to receive an indication from a relay UE that sidelink relay access to a network entity via an inter-working function device is supported at the relay UE, determine that data is to be communicated between the remote UE and the network entity via the inter-working function device, send a request to the relay UE to relay the data between remote UE and the network entity via the inter-working function device, receive, from the relay UE, a response indicating that the sidelink relay access to the network entity via the inter-working function device is available, and communicate, through the relay UE, the data between the remote UE and the network entity via the inter-working function device when the sidelink relay access via the inter-working function device is available.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
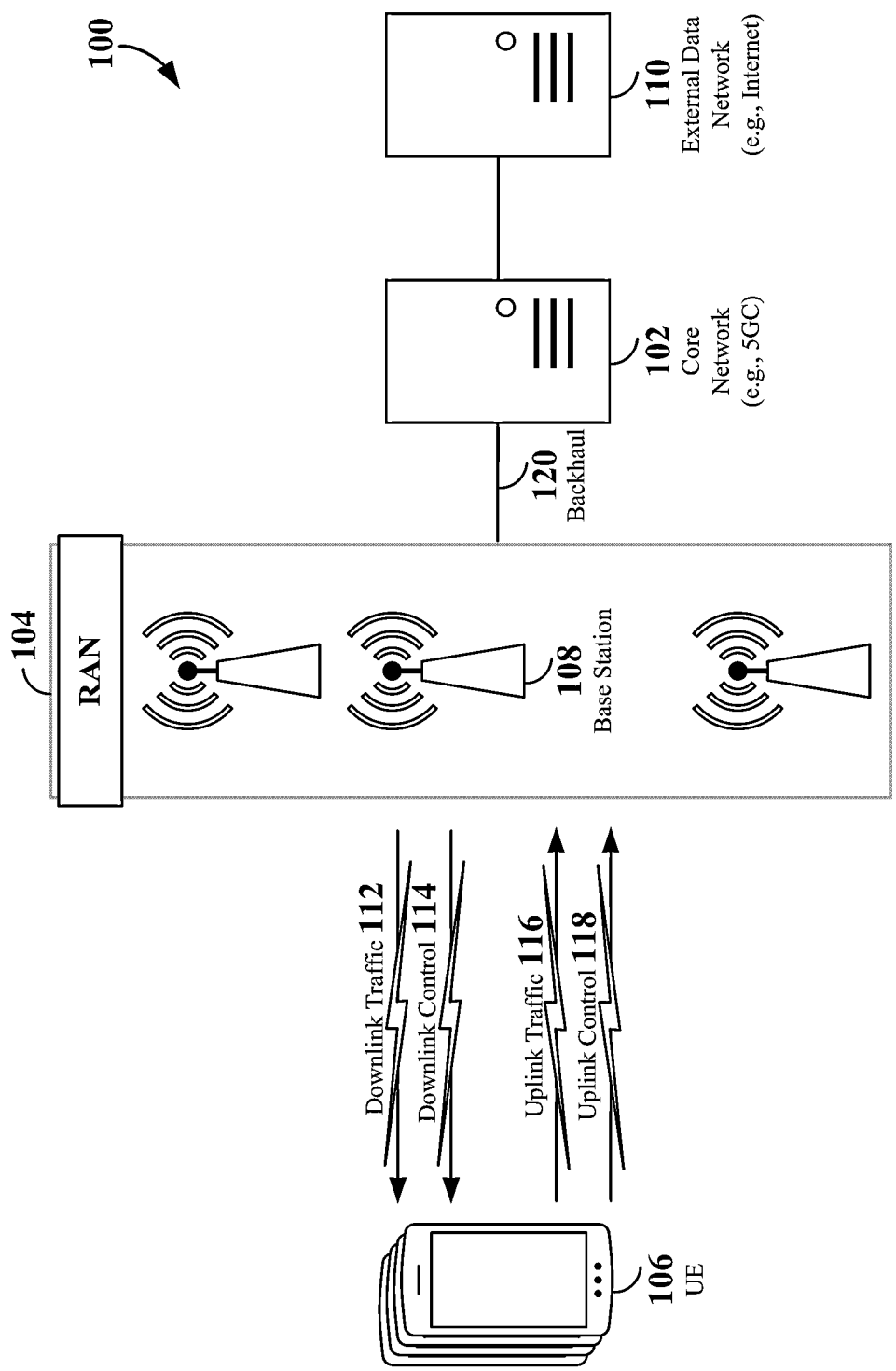
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the base station/scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a base station 108 may broadcast downlink traffic 112 to one or more UEs 106. Broadly, the base station 108 is a node or device responsible for scheduling traffic in a wireless communication network, including the downlink traffic 112 and, in some examples, uplink traffic 116 from one or more UEs 106 to the base station 108. On the other hand, the UE 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
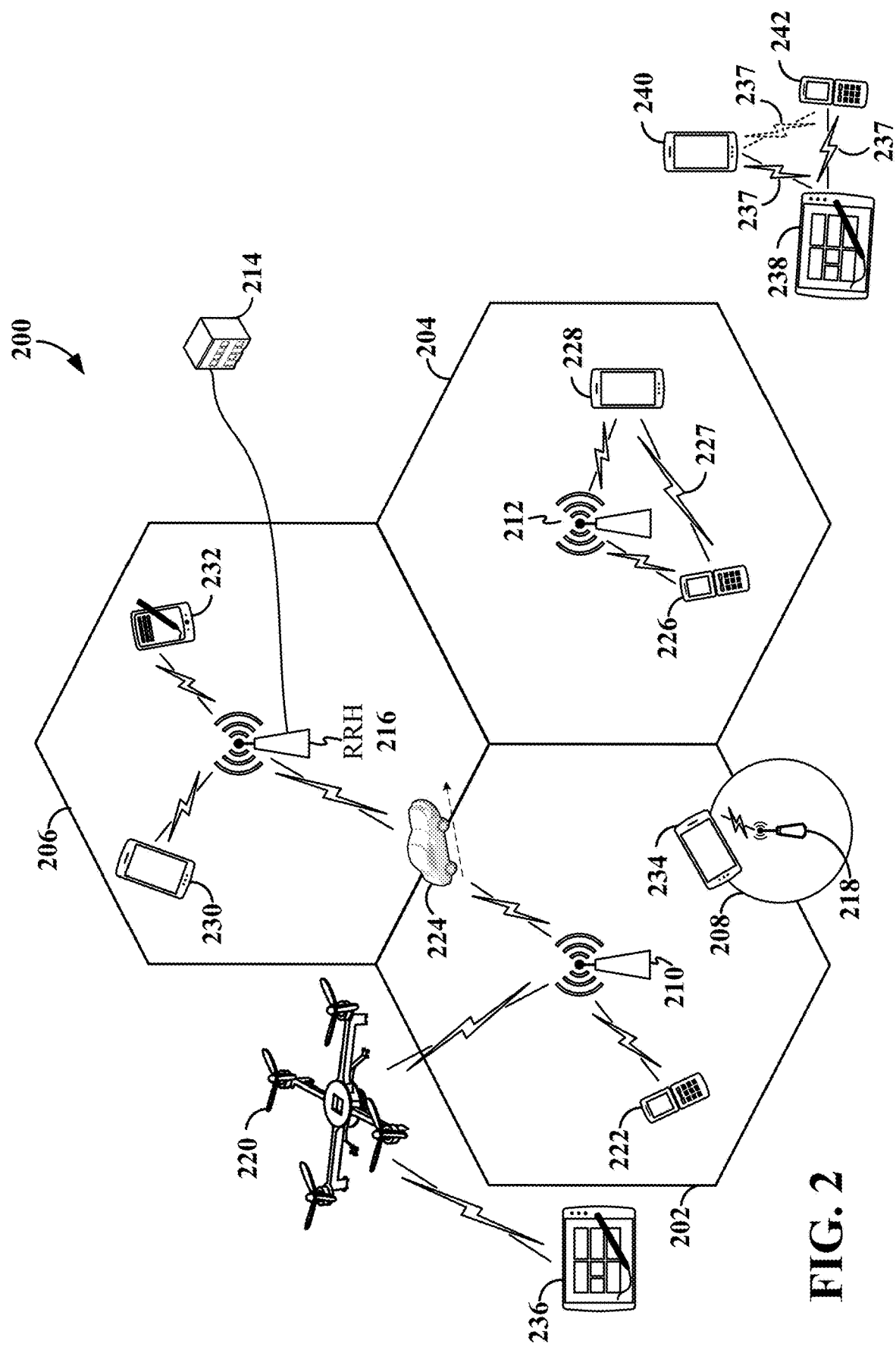
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network (or core network entity) for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations (e.g., scheduling entities) 108 and UEs (e.g., scheduled entities) 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 3:
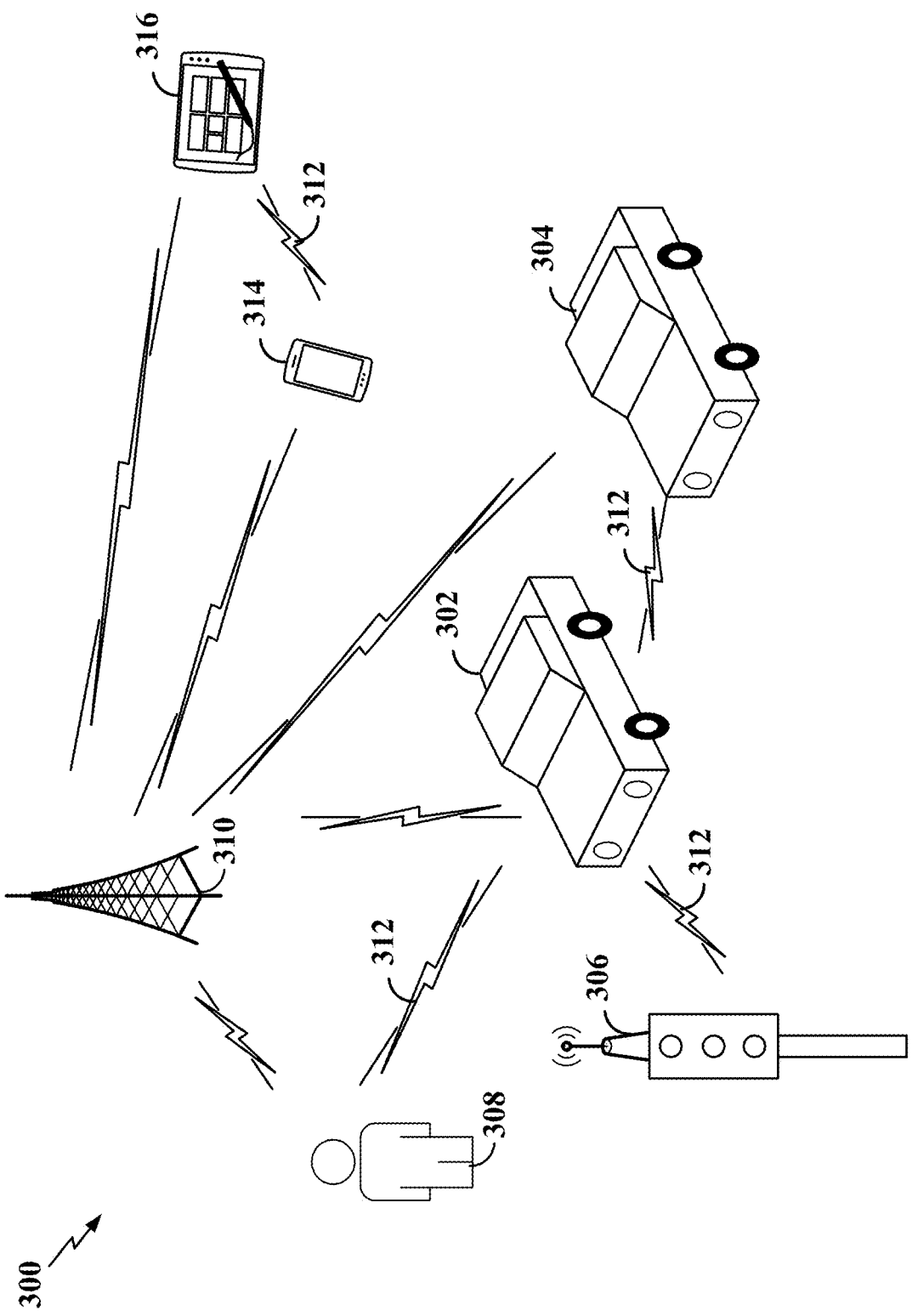
FIG. 3 illustrates an example of a wireless communication network configured to support D2D or sidelink communication.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D3D sidelink 312 communication in other proximity use cases. Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., V-UEs 302 and 304 and P-UE 308) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., UEs 314 and 316) are in communication with the base station 310 (e.g., gNB) via a Uu (e.g., cellular interface) connection to receive ProSe service authorization and provisioning information to support ProSe operations.

To facilitate D3D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 30, 35, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 312 is the same between the two modes. Therefore, from a receiver's point of view, there is no difference between the modes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
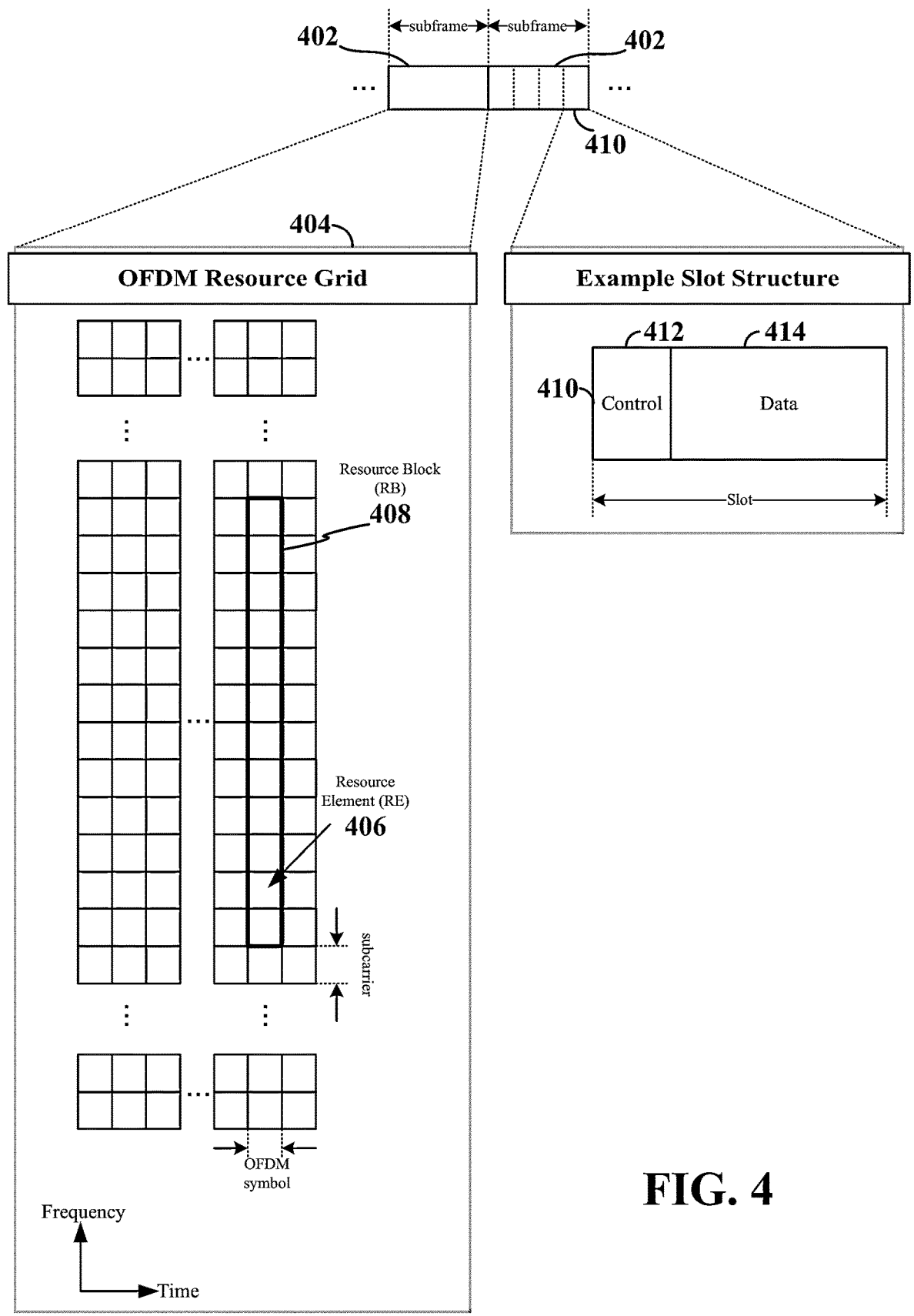
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device.

The channels or carriers described above and illustrated in FIGS. 1 and 4 are not necessarily all the channels or carriers that may be utilized between a base station 108 and UEs 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 5:
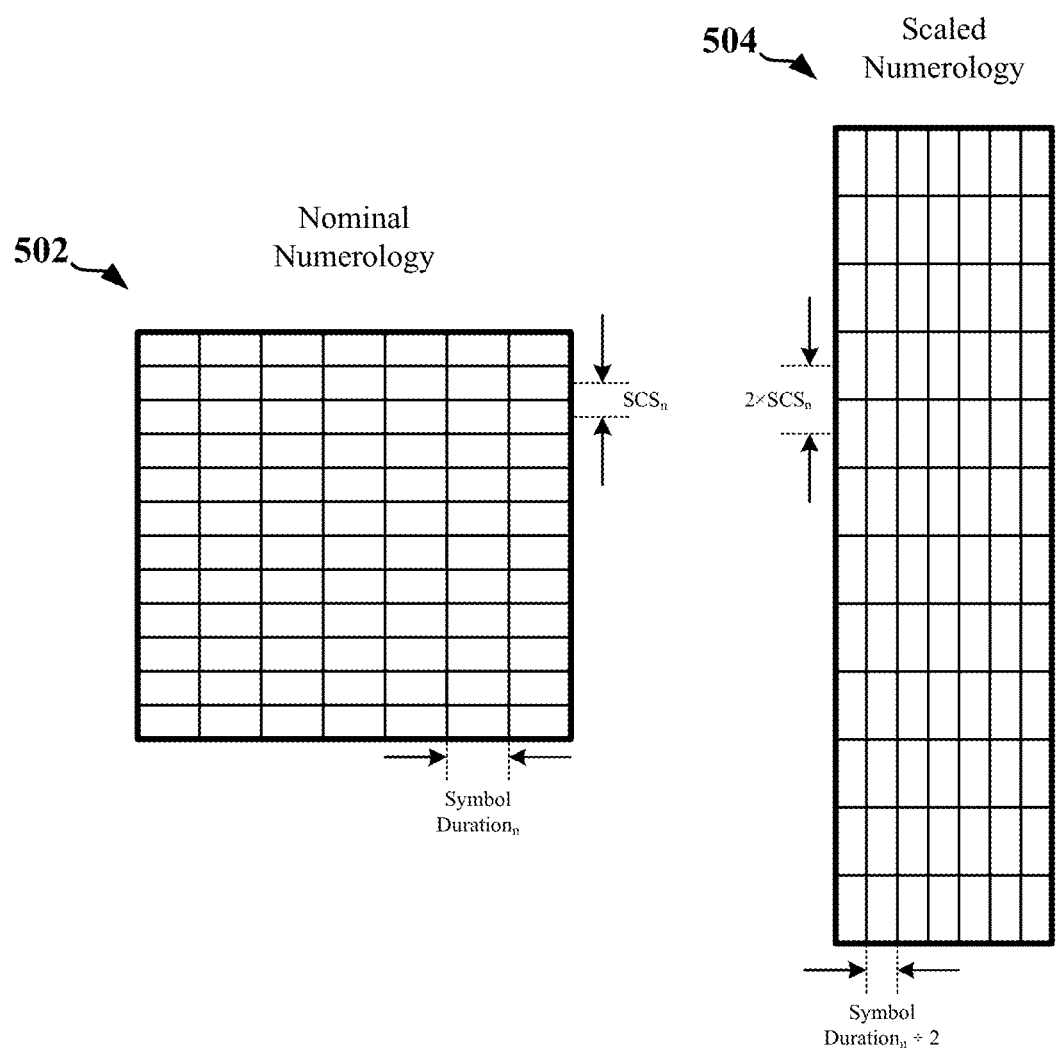
FIG. 5 is a schematic illustration of an OFDM air interface utilizing a scalable numerology according to some aspects of the disclosure.

To illustrate this concept of a scalable numerology, FIG. 5 shows a first RB 502 having a nominal numerology, and a second RB 504 having a scaled numerology. As one example, the first RB 502 may have a 'nominal' subcarrier spacing ($SCS_n$) of 30 kHz, and a 'nominal' symbol duration$_n$ of 333 µs. Here, in the second RB 504, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 504, the scaled numerology includes a scaled symbol duration of half the nominal symbol duration, or (symbol duration$_n$)÷2=167 µs.

Figure 6:
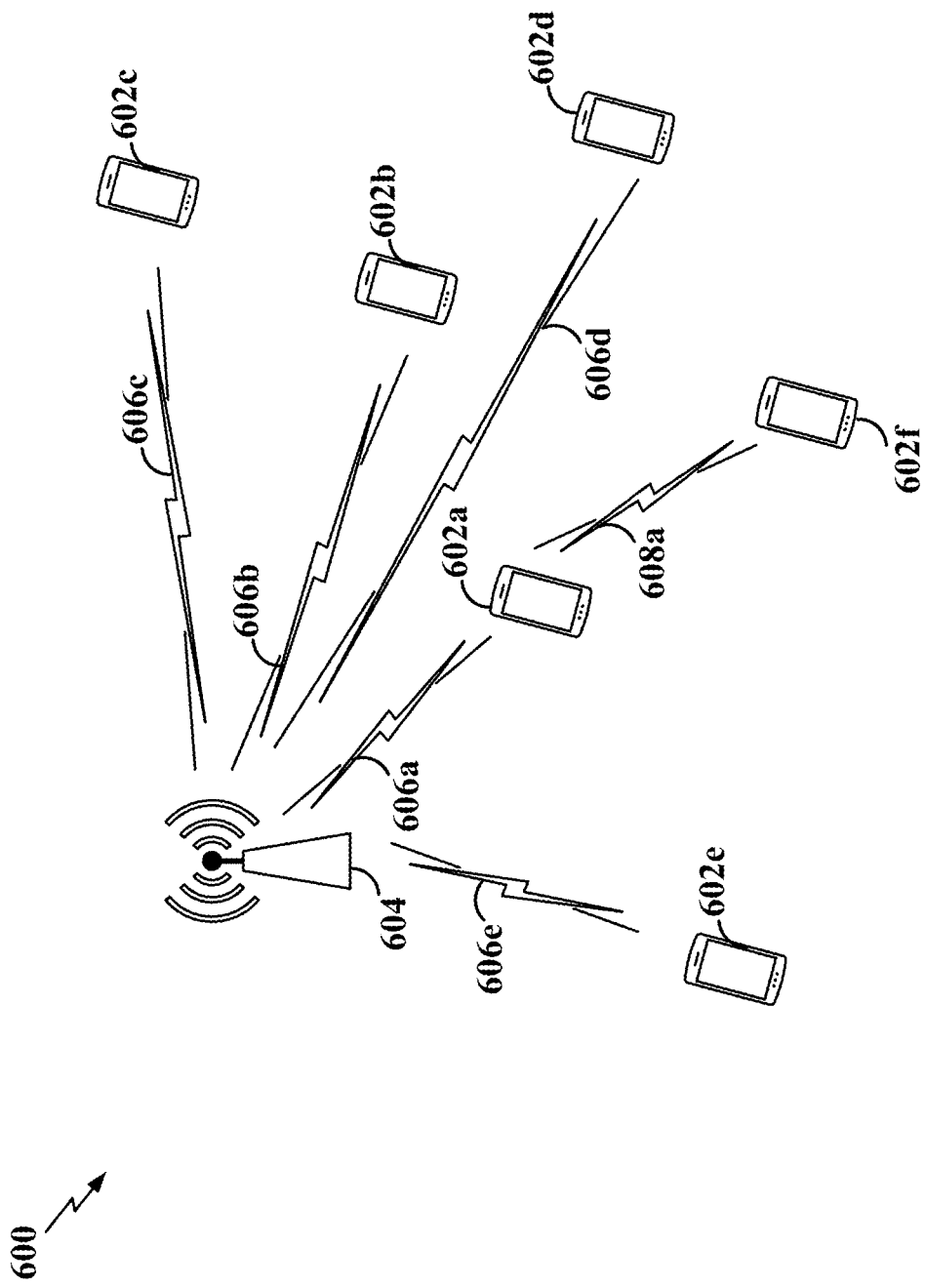
FIG. 6 is a diagram illustrating an exemplary wireless communication network employing D2D relaying.

FIG. 6 is a diagram illustrating an exemplary wireless communication network 600 employing D2D relaying. The wireless communication network 600 may correspond, for example, to the RAN 200 illustrated in FIG. 2. The wireless communication network 600 may include a fifth generation base station (e.g., a gNB) 604 in wireless communication with one or more UEs 602a, 602b, 602c, 602d, and 602e. In the example shown in FIG. 6, the base station 604 may communicate with each of the UEs 602a, 602b, 602c, 602d, and 602e via a respective wireless communication link 606a, 606b, 606c, 606d, and 606e. Each of the wireless communication links 606a, 606b, 606c, 606d, and 606e may utilize a sub-6 GHz carrier frequency or a mm Wave carrier frequency.

In addition, a D2D relay link (sidelink) 608a may be established between UE 602a and another UE 602f to enable relaying of information between the base station 604 and the UE 602f. In this example, the relay link (sidelink) 608a may be established between the UE 602a and UE 602f due to distance or signal blocking between the base station 604 and UE 602f, weak receiving capability of the UE 602f, low transmission power of the UE 602f, and/or limited battery capacity of UE 602f. The relay link 608a between UEs 602a and 602f may enable communication between the base station 604 and UE 602f to be relayed via UE 602a over wireless communication link (e.g., the Uu interface) 606a and relay link (e.g., sidelink) 608a.

In the example shown in FIG. 6, the UE 602a may be referred to as a source relay UE, UEs 602b-602e may be referred to as neighbor relay UEs, and the UE 602f may be referred to as a remote UE. When the source relay UE 602a initiates a relay node switch of the remote UE 602f from the source relay UE 602a to one of the neighbor relay UEs 602b-602e (e.g., due to movement of UE 602a or 602f, channel variance of the channel between UE 602a and 602f, a battery status change of UE 602a or 602f, and/or a load status change associated with UE 602a), the source relay UE 602a may instruct the remote UE 602f to perform the relay node switch.

In some examples, the remote UE 602f may perform the relay node switch operation without assistance from the source relay UE 602a. For example, the remote UE 602f may detect one or more neighbor relay UEs 602b-602e, awaken the one or more of the neighbor relay UEs 602b-602e, and receive and process discovery signals from the one or more neighbor relay UEs 602b-602e. In other examples, the source relay UE 602a may assist the remote UE 602f in discovering and activating neighbor relay UEs 602b-602e for relay node switching. For example, the source relay UE 602a may monitor a scope of possible frequency spectrums to identify the device bandwidth of each of the neighbor relay UEs 602b-602e, exchange messages with each of the neighbor relay UEs 602b-602e to determine the availability of each of the neighbor relay UEs 602b-602e to relay to the remote UE 602f, and then indicate to the available neighbor relay UEs 602b-602e to transmit a discovery signal to the remote UE 602f.

In an aspect of the disclosure, non-3GPP access networks may be connected to a 5G core network (5GC) via a non-3GPP inter-working function (N3IWF). The N3IWF interfaces to 5G core network control-plane functions and user-plane functions via an N2 interface and an N3 interface, respectively.

Figure 7:
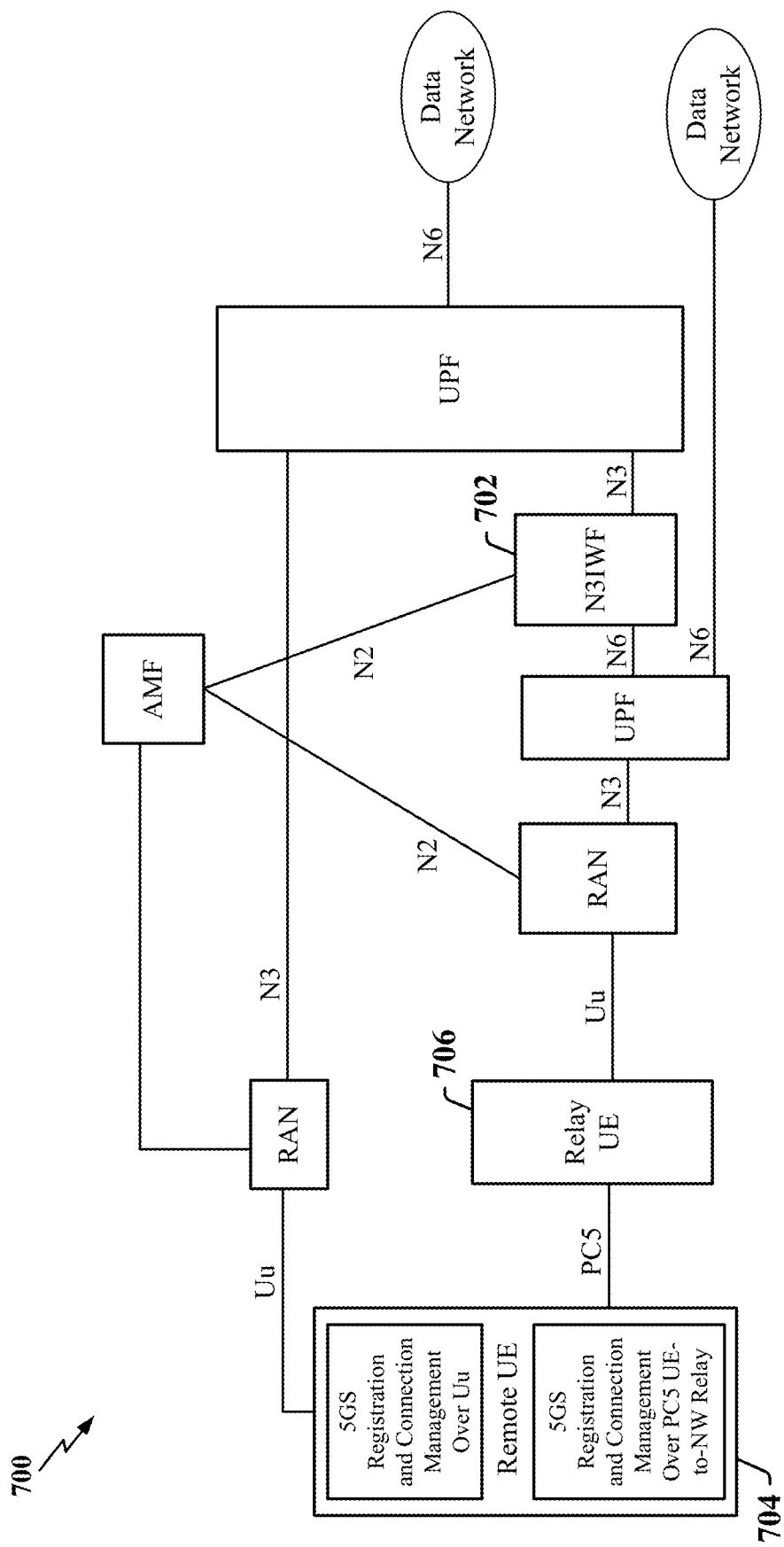
FIG. 7 is an example architecture for a 5G core network with non-3GPP access.

FIG. 7 is a block diagram of a non-roaming architecture for a 5GC system (5GS) 700 with UE-to-NW relay access. In the non-roaming architecture, the 5GS may extend non-access stratum (NAS) registration and connection management over untrusted non-3GPP access using N3IWF 702 for the UE-to-NW relay path. That is, the N3IWF 702 may be reachable by a remote UE 704 over the UE-to-NW relay access path. The remote UE 704 may support independent 5GS registration and connection management procedures over a Uu interface and UE-to-NW relay over a PC5 interface with the 5G core network. Thus, the 5G core network may authorize and authenticate the remote UE 704 operation over the UE-to-NW relay path. Further, the remote UE 704 may discover the N3IWF 702 and establish NAS connection with the network entity using the IPsec Security association with the N3IWF 702. Additionally, a relay UE 706 may establish a relay PDU session (e.g., shared across other remote UEs) and relay both NAS and user plane (UP) traffic to the N3IWF 702.

In an aspect of the disclosure, relay service codes may be used to identify whether a relay UE supports a remote UE's access to the 5G core network (or network entity) via the N3IWF. In a first example, some relay service codes (within a certain range of values) may be reserved for operation via the N3IWF.

In a second example, within each relay service code (e.g., having a length of 24 bits), a first quantity of bits (e.g., first 2 or 3 bits) may be reserved to indicate a type of UE to network (UE-to-NW) relay access supported. For instance, if the first quantity of bits in a relay service code is [0 0], then regular UE-to-NW relay access only is supported. If the first quantity of bits in a relay service code is [0 1], then UE-to-NW relay access via the N3IWF is supported. If the first quantity of bits in a relay service code is [1 0], then UE-to-NW relay access via the N3IWF and Access Traffic Steering, Switching and Splitting (ATSSS) is supported. If the first quantity of bits is [1 1], then UE-to-NW relay access with ATSSS only is supported. In some implementations, the first quantity of bits in the relay service code used to indicate the type of UE-to-NW relay access may be expanded to the first 3 or more bits to indicate other types of relay support.

In a third example, the relay UE may indicate whether each relay service code supports N3IWF access via a special field or flag value. The special field or flag value may be received during relay parameter provisioning by a ProSe function over a PC3 interface or during discovery between the relay UE and a remote UE over a PC5 interface.

As described in some of the examples above, the relay UE dynamically advertises its support of 5G core network access via the N3IWF. Accordingly, it would be beneficial for the remote UE to indicate a request to the relay UE for 5G core network access via the N3IWF. As such, aspects of the present disclosure are directed to expanding a relay UE design to support dynamic control of N3IWF access.

Figure 8:
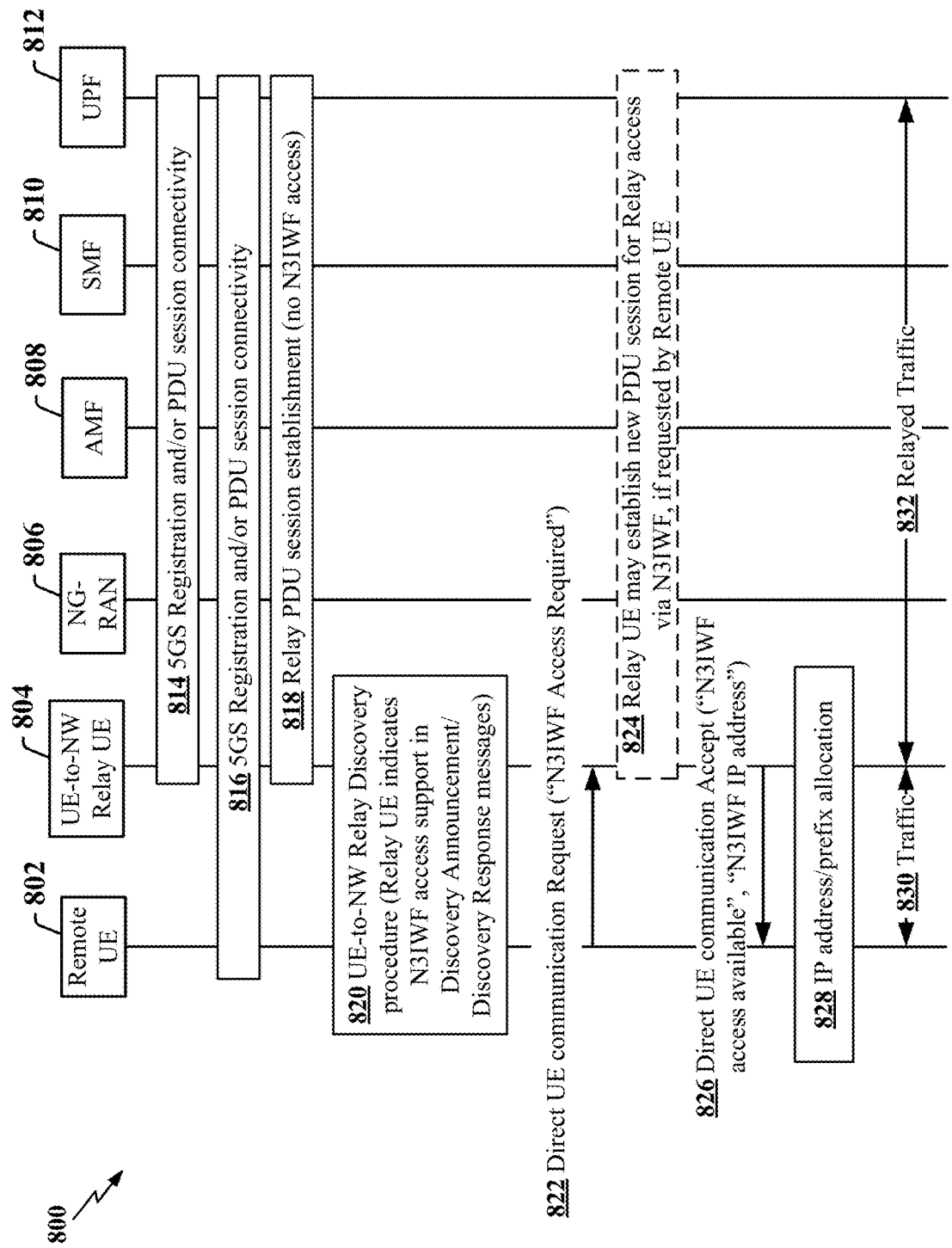
FIG. 8 is an example message flow for establishing 5G core network access via a non-3GPP inter-working function (N3IWF) in accordance with some aspects of the present disclosure.

FIG. 8 is an example message flow 800 for establishing 5G core network access via a N3IWF. The message flow 800 may involve a remote UE 802, a UE-to-NW relay UE 804, a next generation radio access network (NG-RAN) 806, an access and mobility management function (AMF) 808, a session management function (SMF) 810, and a user plane function (UPF) 812.

At step 814, the UE-to-NW relay UE 804 performs a 5G system (5GS) registration procedure and/or attempts to establish PDU session connectivity. Similarly, at step 826, the remote UE 802 performs a 5GS registration procedure and/or attempts to establish PDU session connectivity.

At step 818, the UE-to-NW relay UE 804 establishes a relay PDU session with the 5G core network (or network entity). Here, the UE-to-NW relay UE 804 establishes the relay PDU session without accessing the N3IWF.

At step 820, the UE-to-NW relay UE 804 and the remote UE 802 perform a relay discovery procedure. The relay discovery procedure may involve the communication of discovery messages (e.g., discovery announcement message in Model A and discovery response message in Model B) between the UE-to-NW relay UE 804 and the remote UE 802. In an aspect, the UE-to-NW relay UE 804 may indicate support for accessing the 5G core network (or network entity) via the N3IWF (N3IWF access) via a discovery announcement message or a discovery response message.

For example, the UE-to-NW relay UE 804 may utilize a bit field (e.g., first 2 or 3 bits) in one or more relay service codes to indicate whether N3IWF access is supported. The one or more relay service codes may be included in a discovery message. Accordingly, when the UE-to-NW relay UE 804 broadcasts the discovery message to the remote UE 802 during the relay discovery procedure, the UE-to-NW relay UE 804 advertises its support of N3IWF access via specific bits set in the utilized bit field of the one or more relay service codes included in the discovery message. As such, the remote UE 802 may learn that the UE-to-NW relay UE 804 supports access to the 5G core network via the N3IWF.

In another example, the UE-to-NW relay UE 804 may utilize a special field or flag value within the discovery message to indicate whether N3IWF access is supported. The special field or flag value may be separate from a relay service code in the discovery message. Accordingly, when the UE-to-NW relay UE 804 broadcasts the discovery message to the remote UE 802 during the relay discovery procedure, the UE-to-NW relay UE 804 advertises its support of N3IWF access via the special field or flag value in the discovery message without utilizing a bit field in a relay service code. As such, the remote UE 802 may learn that the UE-to-NW relay UE 804 supports access to the 5G core network via the N3IWF.

At step 822, if the UE-to-NW relay UE 804 advertised support for N3IWF access, then the remote UE 802 may send a direct UE communication request to the UE-to-NW relay UE 804 to indicate that access to the 5G core network via the N3IWF is needed/required (e.g., for a specific relay service code). That is, the remote UE 802 may send to the UE-to-NW relay UE 804 a request for UE-to-NW relaying via the N3IWF. For example, the request may be executed by setting a field in a unicast link establishment message that is sent over a PC5 interface from the remote UE 802 to the UE-to-NW relay UE 804.

At step 824, based on the indication from the remote UE 802 that access to the 5G core network via the N3IWF is needed, the UE-to-NW relay UE 804 may establish a new PDU session with the 5G core network that provides relay access via the N3IWF.

At step 826, the UE-to-NW relay UE 804 may indicate the successful setup of a PDU session with N3IWF access by sending a direct UE communication accept message to the remote UE 802. The direct UE communication accept message may be a unicast link setup response message that includes an N3IWF access available field and an N3IWF IP address (optional).

At step 828, the remote UE 802 and the UE-to-NW relay UE 804 may communicate IP address/prefix allocation information. Thereafter, at step 830, the remote UE 802 begins communicating traffic with the UE-to-NW relay UE 804 that is to be relayed to the 5G core network via the N3IWF. At step 832, the UE-to-NW relay UE 804 relays the traffic associated with the remote UE 802 to the 5G core network via the N3IWF. Additionally or alternatively, the UE-to-NW relay UE 804 may also begin receiving data from the 5G core network via the N3IWF that is to be relayed to the remote UE 802.

In an aspect, for a remote UE that does not indicate a need for N3IWF access (e.g., for a specific relay service code), the UE-to-NW relay UE 804 may establish a separate PDU session without N3IWF access, or may modify an existing PDU session by setting up appropriate packet filters so as to not route the remote UE's traffic to the N3IWF. As such, the remote UE's traffic is directly sent to the data network.

Figure 9:
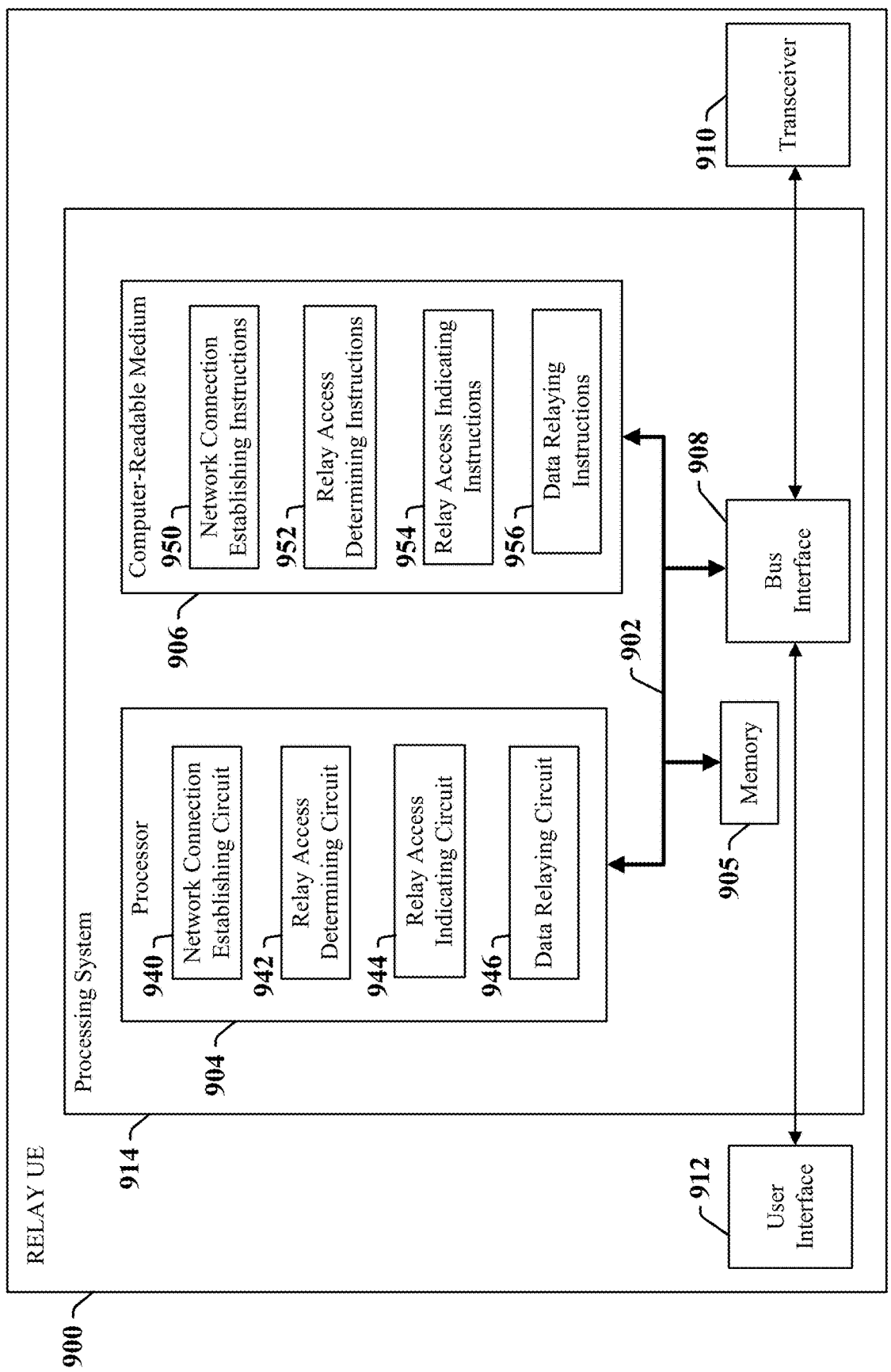
FIG. 9 is a block diagram illustrating an example of a hardware implementation for an exemplary relay UE employing a processing system in accordance with some aspects of the present disclosure.

FIG. 9 is a block diagram illustrating an example of a hardware implementation for an exemplary relay UE 900 employing a processing system 914. For example, the relay UE 900 may be a user equipment (UE) as illustrated in any one or more of FIGS. 1, 2, 7, and/or 8.

The relay UE 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the relay UE 900 may be configured to perform any one or more of the functions described herein. That is, the processor 904, as utilized in the relay UE 900, may be used to implement any one or more of the processes and procedures described below and illustrated in FIG. 10.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided. Of course, such a user interface 912 is optional, and may be omitted in some examples, such as a base station.

In some aspects of the disclosure, the processor 904 may include network connection establishing circuitry 940 configured for various functions, including, for example, establishing a connection with a network entity. For example, the network connection establishing circuitry 940 may be configured to implement one or more of the functions described below in relation to FIG. 10, including, e.g., block 1002. The processor 904 may also include relay access determining circuitry 942 configured for various functions, including, for example, determining whether sidelink relay access to the network entity via an inter-working function device is supported at the relay UE. For example, the relay access determining circuitry 942 may be configured to implement one or more of the functions described below in relation to FIG. 10, including, e.g., block 1004. The processor 904 may also include relay access indicating circuitry 944 configured for various functions, including, for example, indicating, to a remote UE, support of the sidelink relay access to the network entity via the inter-working function device. For example, the relay access indicating circuitry 944 may be configured to implement one or more of the functions described below in relation to FIG. 10, including, e.g., block 1006. The processor 904 may also include data relaying circuitry 946 configured for various functions, including, for example, receiving, from the remote UE, a request to relay data between the remote UE and the network entity via the inter-working function device, relaying the data between the remote UE and the network entity via the inter-working function device based on the request, and for one or more remote UEs that do not indicate the request to relay data via the inter-working function device, establishing a separate data session without access through the inter-working function device and routing the data of the one or more remote UEs directly to the network entity via the separate data session and/or modifying an existing data session by configuring appropriate packet filters so as to not route the data of the one or more remote UEs to the inter-working function device and routing the data of the one or more remote UEs directly to the network entity via the modified data session. For example, the data relaying circuitry 946 may be configured to implement one or more of the functions described below in relation to FIG. 10, including, e.g., blocks 1008, 1010, and 1012.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include network connection establishing instructions 950 configured for various functions, including, for example, establishing a connection with a network entity. For example, the network connection establishing instructions 950 may be configured to implement one or more of the functions described below in relation to FIG. 10, including, e.g., block 1002. The computer-readable storage medium 906 may also include relay access determining instructions 952 configured for various functions, including, for example, determining whether sidelink relay access to the network entity via an inter-working function device is supported at the relay UE. For example, the relay access determining instructions 952 may be configured to implement one or more of the functions described below in relation to FIG. 10, including, e.g., block 1004. The computer-readable storage medium 906 may also include relay access indicating instructions 954 configured for various functions, including, for example, indicating, to a remote UE, support of the sidelink relay access to the network entity via the inter-working function device. For example, the relay access indicating instructions 954 may be configured to implement one or more of the functions described below in relation to FIG. 10, including, e.g., block 1006. The computer-readable storage medium 906 may also include data relaying instructions 956 configured for various functions, including, for example, receiving, from the remote UE, a request to relay data between the remote UE and the network entity via the inter-working function device, relaying the data between the remote UE and the network entity via the inter-working function device based on the request, and for one or more remote UEs that do not indicate the request to relay data via the inter-working function device, establishing a separate data session without access through the inter-working function device and routing the data of the one or more remote UEs directly to the network entity via the separate data session and/or modifying an existing data session by configuring appropriate packet filters so as to not route the data of the one or more remote UEs to the inter-working function device and routing the data of the one or more remote UEs directly to the network entity via the modified data session. For example, the data relaying instructions 956 may be configured to implement one or more of the functions described below in relation to FIG. 10, including, e.g., blocks 1008, 1010, and 1012.

Figure 10:
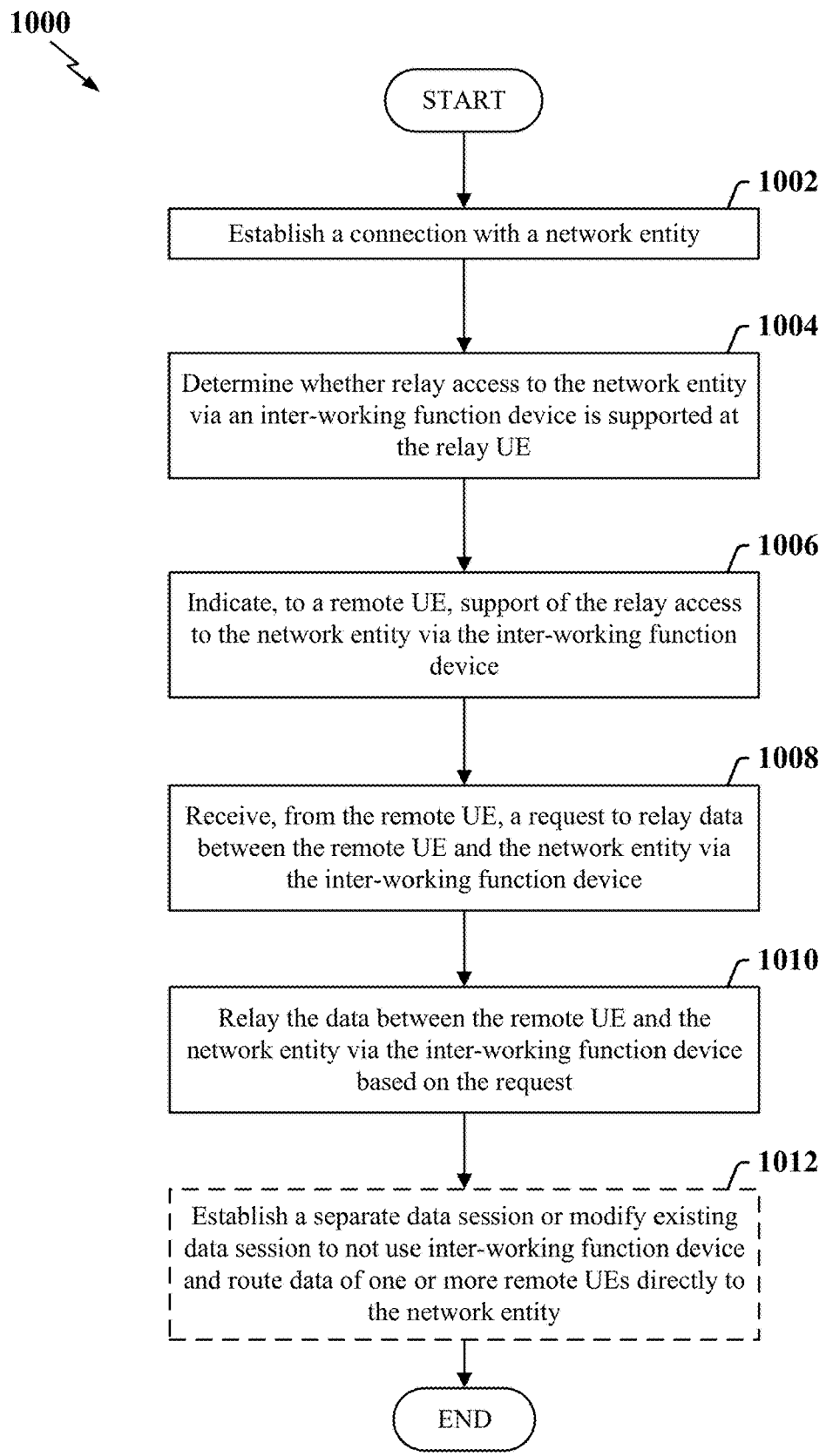
FIG. 10 is a flow chart illustrating an exemplary process for relaying data between a remote UE and a network entity via a N3IWF in accordance with some aspects of the present disclosure.

FIG. 10 is a flow chart illustrating an exemplary process 1000 for relaying data between a remote UE and a network entity via a non-3GPP inter-working function (N3IWF). As described below, some or all illustrated features may be omitted in a particular implementation within the scope of the present disclosure, and some illustrated features may not be required for implementation of all examples. In some examples, the process 1000 may be carried out by the relay UE 900 illustrated in FIG. 9. In some examples, the process 1000 may be carried out by any suitable apparatus or means for carrying out the functions or algorithm described below.

At block 1002, the relay UE establishes a connection with a network entity (e.g., 5G core network entity). At block 1004, the relay determines whether sidelink relay access to the network entity via an inter-working function device is supported at the relay UE. The inter-working function device may be a non-3GPP inter-working function (N3IWF) device.

At block 1006, the relay UE indicates, to a remote UE, support of the sidelink relay access to the network entity via the inter-working function device. In an aspect, the relay UE indicates the support by setting a value of at least one bit in a discovery message to indicate the support and sending the discovery message to the remote UE (e.g., during a discovery procedure). For example, the at least one bit may be part of a bit field (e.g., first 2 or 3 bits) of a relay service code included in the discovery message. In another example, the at least one bit may be a special field or flag value within the discovery message that is separate from the relay service code.

At block 1008, the relay UE receives, from the remote UE, a request to relay data between the remote UE and the network entity via the inter-working function device. The request may be a sidelink unicast link establishment request message. At block 1010, the relay UE relays the data between the remote UE and the network entity via the inter-working function device based on the request.

In an aspect, in order to relay the data, the relay UE first establishes with the network entity a data session for the sidelink relay access via the inter-working function device based on the request. Upon establishing the data session, the relay UE sends a response to the remote UE indicating that the relay access via the inter-working function device is available. The response may be a sidelink unicast link establishment response message. The relay UE then relays the data between the remote UE and the network entity via the inter-working function device based on the established data session. In an aspect, the response includes a bit field having at least one bit set to a value to indicate an availability of the sidelink relay access via the inter-working function device and/or an internet protocol (IP) address of the inter-working function device.

At block 1012, for one or more remote UEs that do not indicate the request to relay data via the inter-working function device, the relay UE may optionally establish a separate data session without access through the inter-working function device and route the data of the one or more remote UEs directly to the network entity via the separate data session. Alternatively, the relay UE may optionally modify an existing data session by configuring appropriate packet filters so as to not route the data of the one or more remote UEs to the inter-working function device and route the data of the one or more remote UEs directly to the network entity via the modified data session.

In one configuration, the relay UE 900 includes means for establishing (e.g., network connection establishing circuitry 940 and/or transceiver 910) a connection with a network entity, means for determining (e.g., relay access determining circuitry 942) whether relay access to the network entity via an inter-working function device is supported at the relay UE, means for indicating (e.g., relay access indicating circuitry 944 and/or transceiver 910), to a remote UE, support of the relay access to the network entity via the inter-working function device, means for receiving (e.g., data relaying circuitry 946 and/or transceiver 910), from the remote UE, a request to relay data between the remote UE and the network entity via the inter-working function device, means for relaying (e.g., data relaying circuitry 946 and/or transceiver 910) the data between the remote UE and the network entity via the inter-working function device based on the request, and for one or more remote UEs that do not indicate the request to relay data via the inter-working function device: means for establishing (e.g., data relaying circuitry 946 and/or transceiver 910) a separate data session without access through the inter-working function device and routing the data of the one or more remote UEs directly to the network entity via the separate data session and means for modifying (e.g., data relaying circuitry 946 and/or transceiver 910) an existing data session by configuring appropriate packet filters so as to not route the data of the one or more remote UEs to the inter-working function device and routing the data of the one or more remote UEs directly to the network entity via the modified data session. In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 7, and/or 8, and utilizing, for example, the processes and/or algorithms described herein in relation to FIG. 10.

Figure 11:
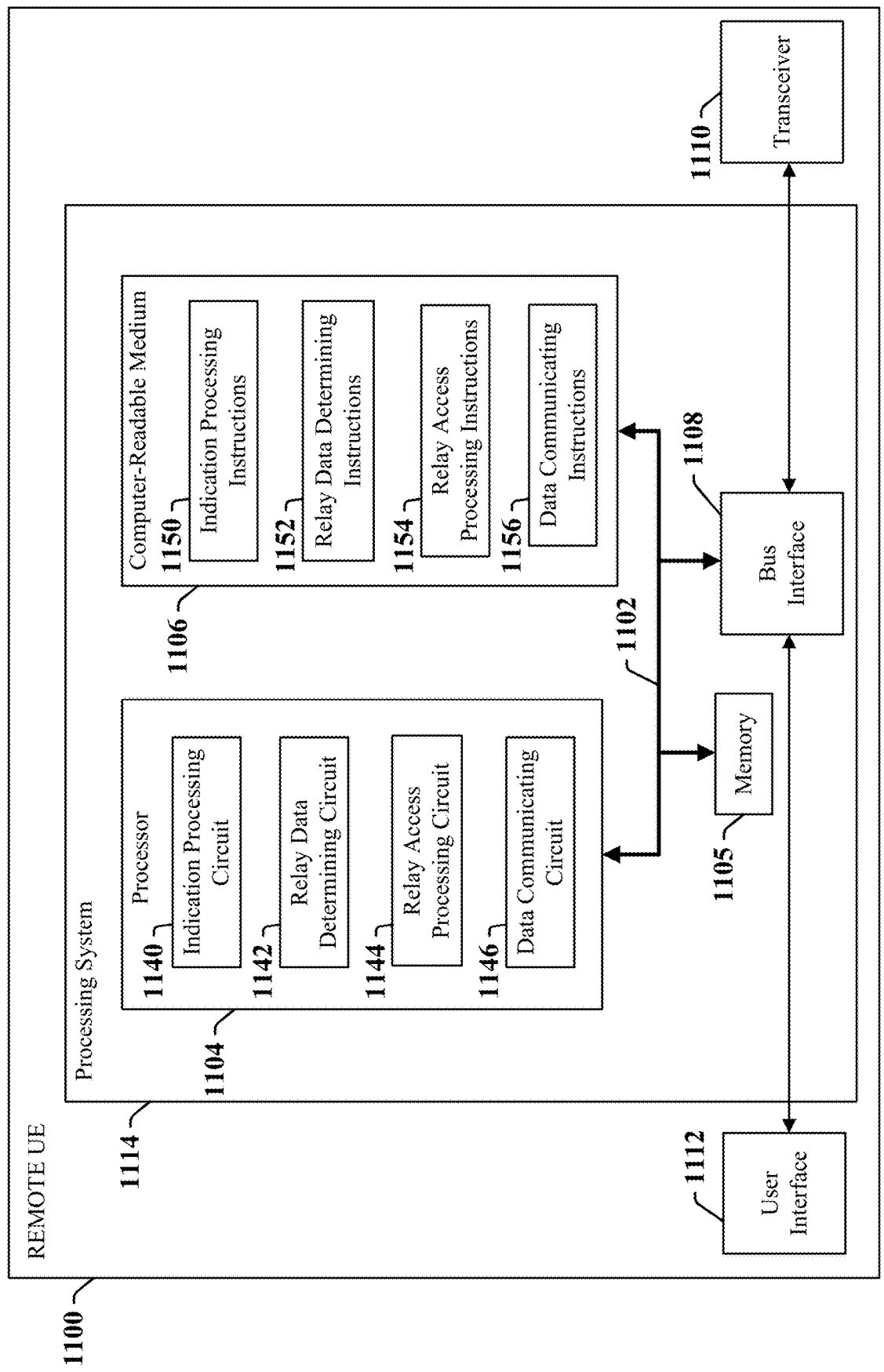
FIG. 11 is a block diagram illustrating an example of a hardware implementation for an exemplary remote UE employing a processing system in accordance with some aspects of the present disclosure.

FIG. 11 is a conceptual diagram illustrating an example of a hardware implementation for an exemplary remote UE 1100 employing a processing system 1114. In accordance with various aspects of the disclosure, an element, or any portion of an element, or any combination of elements may be implemented with a processing system 1114 that includes one or more processors 1104. For example, the remote UE 1100 may be a user equipment (UE) as illustrated in any one or more of FIGS. 1, 2, 7, and/or 8.

The processing system 1114 may be substantially the same as the processing system 1014 illustrated in FIG. 9, including a bus interface 1108, a bus 1102, memory 1105, a processor 1104, and a computer-readable medium 1106. Furthermore, the remote UE 1100 may include a user interface 1112 and a transceiver 1110 substantially similar to those described above in FIG. 9. That is, the processor 1104, as utilized in a remote UE 1100, may be used to implement any one or more of the processes described below and illustrated in FIG. 12.

In some aspects of the disclosure, the processor 1104 may include indication processing circuitry 1140 configured for various functions, including, for example, receiving an indication from a relay UE that sidelink relay access to a network entity via an inter-working function device is supported at the relay UE. For example, the indication processing circuitry 1140 may be configured to implement one or more of the functions described below in relation to FIG. 12, including, e.g., block 1202. The processor 1104 may also include relay data determining circuitry 1142 configured for various functions, including, for example, determining that data is to be communicated between the remote UE and the network entity via the inter-working function device. For example, the relay data determining circuitry 1142 may be configured to implement one or more of the functions described below in relation to FIG. 12, including, e.g., block 1204. The processor 1104 may also include relay access processing circuitry 1144 configured for various functions, including, for example, sending a request to the relay UE to relay the data between remote UE and the network entity via the inter-working function device and receiving, from the relay UE, a response indicating that the sidelink relay access to the network entity via the inter-working function device is available. For example, the relay access processing circuitry 1144 may be configured to implement one or more of the functions described below in relation to FIG. 12, including, e.g., blocks 1206 and 1208. The processor 1104 may also include data communicating circuitry 1146 configured for various functions, including, for example, communicating, through the relay UE, the data between the remote UE and the network entity via the inter-working function device when the sidelink relay access via the inter-working function device is available. For example, the data communicating circuitry 1146 may be configured to implement one or more of the functions described below in relation to FIG. 12, including, e.g., block 1210.

In one or more examples, the computer-readable storage medium 1106 may include indication processing instructions 1150 configured for various functions, including, for example, receiving an indication from a relay UE that sidelink relay access to a network entity via an inter-working function device is supported at the relay UE. For example, the indication processing instructions 1150 may be configured to implement one or more of the functions described below in relation to FIG. 12, including, e.g., block 1202. The computer-readable storage medium 1106 may also include relay data determining instructions 1152 configured for various functions, including, for example, determining that data is to be communicated between the remote UE and the network entity via the inter-working function device. For example, the relay data determining instructions 1152 may be configured to implement one or more of the functions described below in relation to FIG. 12, including, e.g., block 1204. The computer-readable storage medium 1106 may also include relay access processing instructions 1154 configured for various functions, including, for example, sending a request to the relay UE to relay the data between remote UE and the network entity via the inter-working function device and receiving, from the relay UE, a response indicating that the sidelink relay access to the network entity via the inter-working function device is available. For example, the relay access processing instructions 1154 may be configured to implement one or more of the functions described below in relation to FIG. 12, including, e.g., blocks 1206 and 1208. The computer-readable storage medium 1106 may also include data communicating instructions 1156 configured for various functions, including, for example, communicating, through the relay UE, the data between the remote UE and the network entity via the inter-working function device when the sidelink relay access via the inter-working function device is available. For example, the data communicating instructions 1156 may be configured to implement one or more of the functions described below in relation to FIG. 12, including, e.g., block 1210.

Figure 12:
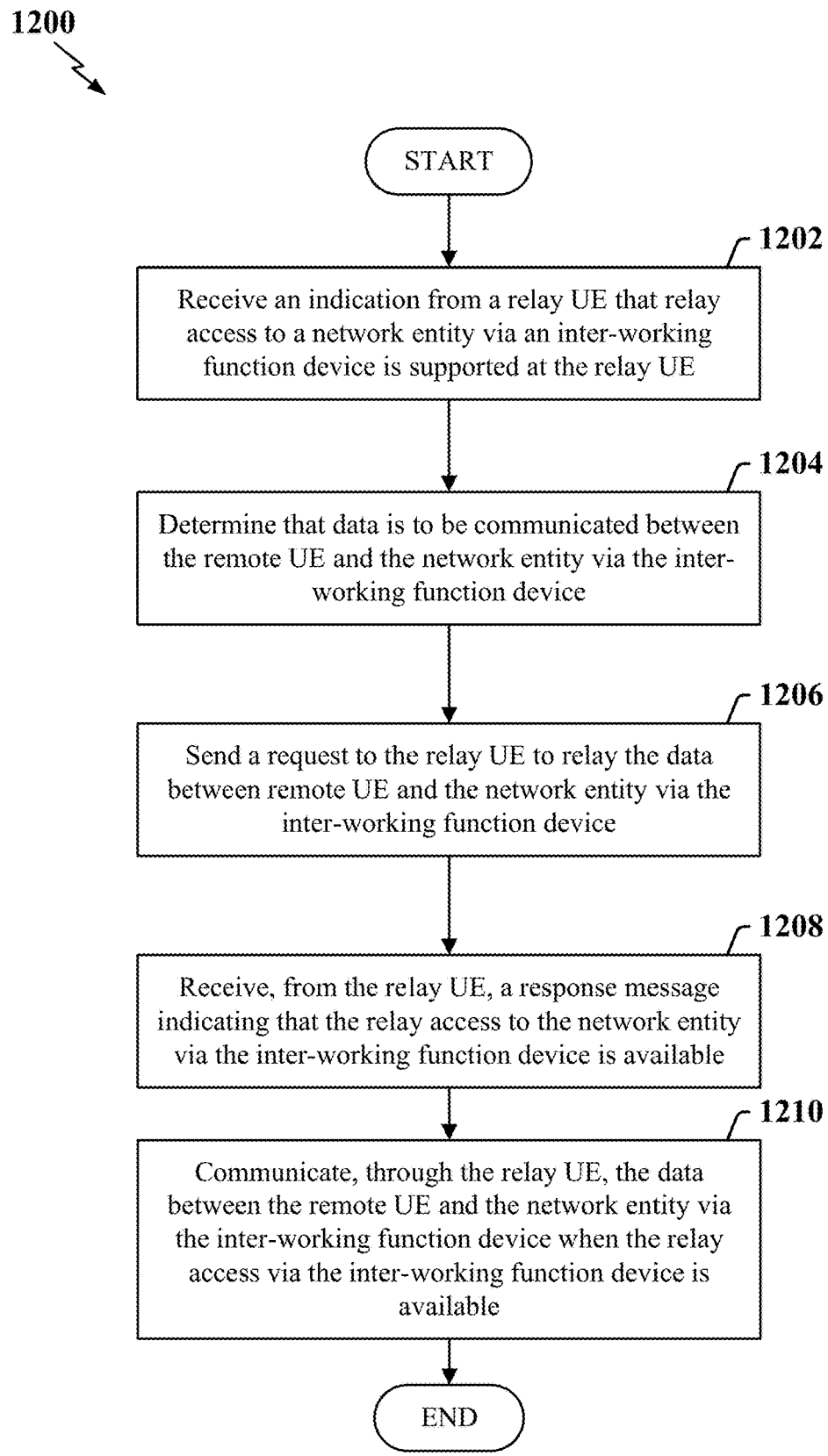
FIG. 12 is a flow chart illustrating an exemplary process for relaying data between a remote UE and a network entity via a N3IWF in accordance with some aspects of the present disclosure.

FIG. 12 is a flow chart illustrating an exemplary process 1200 for relaying data between a remote UE and a network entity via a non-3GPP inter-working function (N3IWF). As described below, some or all illustrated features may be omitted in a particular implementation within the scope of the present disclosure, and some illustrated features may not be required for implementation of all examples. In some examples, the process 1200 may be carried out by the remote UE 1100 illustrated in FIG. 11. In some examples, the process 1200 may be carried out by any suitable apparatus or means for carrying out the functions or algorithm described below.

At block 1202, the remote UE receives an indication from a relay UE that sidelink relay access to a network entity (e.g., 5G core network entity) via an inter-working function device is supported at the relay UE. The inter-working function device may be a non-3GPP inter-working function (N3IWF) device.

In an aspect, the indication is included in a discovery message received from the relay UE (e.g., during a discovery procedure). The indication may be a value of at least one bit in the discovery message. For example, the least one bit is part of a bit field (e.g., first 2 or 3 bits) of a relay service code included in the discovery message. In another example, the at least one bit may be a special field or flag value within the discovery message that is separate from the relay service code.

At block 1204, the remote UE determines that data is to be communicated between the remote UE and the network entity via the inter-working function device. At block 1206, the remote UE sends a request to the relay UE to relay the data between remote UE and the network entity via the inter-working function device. The request may be a sidelink unicast link establishment request message.

At block 1208, the remote UE receives, from the relay UE, a response indicating that the sidelink relay access to the network entity via the inter-working function device is available. The response may be a sidelink unicast link establishment response message. In an aspect, the response includes a bit field having at least one bit set to a value to indicate an availability of the relay access via the inter-working function device and/or an internet protocol (IP) address of the inter-working function device.

At block 1210, the remote UE communicates, through the relay UE, the data between the remote UE and the network entity via the inter-working function device when the sidelink relay access via the inter-working function device is available.

In one configuration, the remote UE 1100 includes means for receiving (e.g., indication processing circuitry 1140 and/or transceiver 1110) an indication from a relay UE that relay access to a network entity via an inter-working function device is supported at the relay UE, means for determining (e.g., relay data determining circuitry 1142) that data is to be communicated between the remote UE and the network entity via the inter-working function device, means for sending (e.g., relay access processing circuitry 1144 and/or transceiver 1110) a request to the relay UE to relay the data between remote UE and the network entity via the inter-working function device, means for receiving (e.g., relay access processing circuitry 1144 and/or transceiver 1110), from the relay UE, a response indicating that the relay access to the network entity via the inter-working function device is available, and means for communicating (e.g., data communicating circuitry 1146), through the relay UE, the data between the remote UE and the network entity via the inter-working function device when the relay access via the inter-working function device is available. In one aspect, the aforementioned means may be the processor(s) 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, 7, and/or 8, and utilizing, for example, the processes and/or algorithms described herein in relation to FIG. 12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method of wireless communication at a relay user equipment (UE), comprising: establishing a connection with a network entity; determining whether sidelink relay access to the network entity via an inter-working function device is supported at the relay UE; indicating, to a remote UE, support of the sidelink relay access to the network entity via the inter-working function device; receiving, from the remote UE, a request to relay data between the remote UE and the network entity via the inter-working function device; and relaying the data between the remote UE and the network entity via the inter-working function device based on the request.

Aspect 2: The method of aspect 1, wherein the indicating the support of the sidelink relay access via the inter-working function device comprises: setting a value of at least one bit in a discovery message to indicate the support; and sending the discovery message to the remote UE.

Aspect 3: The method of aspect 1 or 2, wherein the at least one bit is part of a bit field of a relay service code included in the discovery message.

Aspect 4: The method of any one of aspects 1 through 3, wherein the request is a sidelink unicast link establishment request message.

Aspect 5: The method of any one of aspects 1 through 4, wherein the relaying the data comprises: establishing, with the network entity, a data session for the sidelink relay access via the inter-working function device based on the sidelink unicast link establishment request message; sending, to the remote UE upon establishing the data session, a sidelink unicast link establishment response message indicating that the sidelink relay access via the inter-working function device is available; and relaying the data between the remote UE and the network entity via the inter-working function device based on the established data session.

Aspect 6: The method of any one of aspects 1 through 5, wherein the sidelink unicast link establishment response message includes at least one of: a bit field having at least one bit set to a value to indicate an availability of the sidelink relay access via the inter-working function device; or an internet protocol (IP) address of the inter-working function device.

Aspect 7: The method of any one of aspects 1 through 5, wherein for one or more remote UEs that do not indicate the request to relay data via the inter-working function device, the method further comprises at least one of: establishing a separate data session without access through the inter-working function device and routing the data of the one or more remote UEs directly to the network entity via the separate data session; or modifying an existing data session by configuring appropriate packet filters so as to not route the data of the one or more remote UEs to the inter-working function device and routing the data of the one or more remote UEs directly to the network entity via the modified data session.

Aspect 8: The method of any one of aspects 1 through 7, wherein the inter-working function device is a non-3GPP inter-working function (N3IWF) device and the network entity is a 5G core network entity.

Aspect 9: A relay UE comprising at least one processor, and a memory coupled to the at least one processor, the at least one processor and the memory configured to perform a method of any one of aspects 1 through 8.

Aspect 10: A relay UE comprising at least one means for performing a method of any one of aspects 1 through 8.

Aspect 11: A non-transitory computer-readable medium storing code at a relay UE, the code comprising instructions executable by a processor to perform a method of any one of aspects 1 through 8.

Aspect 12: A method of wireless communication at a remote user equipment (UE), comprising: receiving an indication from a relay UE that sidelink relay access to a network entity via an inter-working function device is supported at the relay UE; determining that data is to be communicated between the remote UE and the network entity via the inter-working function device; sending a request to the relay UE to relay the data between remote UE and the network entity via the inter-working function device; receiving, from the relay UE, a response indicating that the sidelink relay access to the network entity via the inter-working function device is available; and communicating, through the relay UE, the data between the remote UE and the network entity via the inter-working function device when the sidelink relay access via the inter-working function device is available.

Aspect 13: The method of aspect 12, wherein the indication is included in a discovery message received from the relay UE.

Aspect 14: The method of aspect 12 or 13, wherein the indication comprises a value of at least one bit in the discovery message.

Aspect 15: The method of any one of aspects 12 through 14, wherein the at least one bit is part of a bit field of a relay service code included in the discovery message.

Aspect 16: The method of any one of aspects 12 through 15, wherein the request is a sidelink unicast link establishment request message.

Aspect 17: The method of any one of aspects 12 through 16, wherein the response is a sidelink unicast link establishment response message that includes at least one of: a bit field having at least one bit set to a value to indicate an availability of the sidelink relay access via the inter-working function device; or an internet protocol (IP) address of the inter-working function device.

Aspect 18: The method of any one of aspects 12 through 17, wherein the inter-working function device is a non-3GPP inter-working function (N3IWF) device and the network entity is a 5G core network entity.

Aspect 19: A remote UE comprising at least one processor, and a memory coupled to the at least one processor, the at least one processor and the memory configured to perform a method of any one of aspects 1 through 18.

Aspect 20: A remote UE comprising at least one means for performing a method of any one of aspects 1 through 18.

Aspect 21: A non-transitory computer-readable medium storing code at a remote UE, the code comprising instructions executable by a processor to perform a method of any one of aspects 1 through 18.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a relay user equipment (UE), comprising:
    establishing a connection with a network entity;
    determining whether sidelink relay access to the network entity via a non-3GPP inter-working function (N3IWF) device is supported at the relay UE, wherein the sidelink relay access to the network entity flows at least from the relay UE to a radio access network (RAN), from the RAN to the N3IWF device, and from the N3IWF device to the network entity;
    indicating, to a remote UE, support of the sidelink relay access to the network entity via the N3IWF device;
    receiving, from the remote UE, a request to relay data between the remote UE and the network entity via the N3IWF device; and
    relaying the data between the remote UE and the network entity via the N3IWF device based on the request.

2. The method of claim 1, wherein the indicating the support of the sidelink relay access via the N3IWF device comprises:
    setting a value of at least one bit in a discovery message to indicate the support; and
    sending the discovery message to the remote UE.

3. The method of claim 2, wherein the at least one bit is part of a bit field of a relay service code included in the discovery message.

4. The method of claim 1, wherein the request is a sidelink unicast link establishment request message.

5. The method of claim 4, wherein the relaying the data comprises:
    establishing, with the network entity, a data session for the sidelink relay access via the N3IWF device based on the sidelink unicast link establishment request message;
    sending, to the remote UE upon establishing the data session, a sidelink unicast link establishment response message indicating that the sidelink relay access via the N3IWF device is available; and
    relaying the data between the remote UE and the network entity via the N3IWF device based on the established data session.

6. The method of claim 5, wherein the sidelink unicast link establishment response message includes at least one of:
    a bit field having at least one bit set to a value to indicate an availability of the sidelink relay access via the N3IWF device; or
    an internet protocol (IP) address of the N3IWF device.

7. The method of claim 5, wherein for one or more remote UEs that do not indicate the request to relay data via the N3IWF device, the method further comprises at least one of:
    establishing a separate data session without access through the N3IWF device and routing the data of the one or more remote UEs directly to the network entity via the separate data session; or
    modifying an existing data session by configuring appropriate packet filters so as to not route the data of the one or more remote UEs to the N3IWF device and routing the data of the one or more remote UEs directly to the network entity via the modified data session.

8. The method of claim 1, wherein the network entity is a 5G core network entity.

9. A relay user equipment (UE) for wireless communication, comprising:
   at least one processor;
   a transceiver communicatively coupled to the at least one processor; and
   a memory communicatively coupled to the at least one processor, wherein the at least one processor is configured to:
      establish a connection with a network entity,
      determine whether sidelink relay access to the network entity via a non-3GPP inter-working function (N3IWF) device is supported at the relay UE, wherein the sidelink relay access to the network entity flows at least from the relay UE to a radio access network (RAN), from the RAN to the N3IWF device, and from the N3IWF device to the network entity,
      indicate, to a remote UE, support of the sidelink relay access to the network entity via the N3IWF device,
      receive, from the remote UE, a request to relay data between the remote UE and the network entity via the N3IWF device, and
      relay the data between the remote UE and the network entity via the N3IWF device based on the request.

10. The relay UE of claim 9, wherein the at least one processor configured to indicate the support of the sidelink relay access via the N3IWF device is configured to:
   set a value of at least one bit in a discovery message to indicate the support; and
   send the discovery message to the remote UE.

11. The relay UE of claim 10, wherein the at least one bit is part of a bit field of a relay service code included in the discovery message.

12. The relay UE of claim 9, wherein the request is a sidelink unicast link establishment request message.

13. The relay UE of claim 12, wherein the at least on processor configured to relay the data is configured to:
   establish, with the network entity, a data session for the sidelink relay access via the (N3IWF) device based on the sidelink unicast link establishment request message;
   send, to the remote UE upon establishing the data session, a sidelink unicast link establishment response message indicating that the sidelink relay access via the N3IWF device is available; and
   relay the data between the remote UE and the network entity via the N3IWF device based on the established data session.

14. The relay UE of claim 13, wherein the sidelink unicast link establishment response message includes at least one of:
   a bit field having at least one bit set to a value to indicate an availability of the sidelink relay access via the N3IWF device; or
   an internet protocol (IP) address of the N3IWF device.

15. The relay UE of claim 13, wherein for one or more remote UEs that do not indicate the request to relay data via the N3IWF device, the at least one processor is further configured to at least one of:
   establish a separate data session without access through the N3IWF device and routing the data of the one or more remote UEs directly to the network entity via the separate data session; or
   modify an existing data session by configuring appropriate packet filters so as to not route the data of the one or more remote UEs to the N3IWF device and routing the data of the one or more remote UEs directly to the network entity via the modified data session.

16. The relay UE of claim 9, wherein the network entity is a 5G core network entity.

17. A method of wireless communication at a remote user equipment (UE), comprising:
   receiving an indication from a relay UE that sidelink relay access to a network entity via a non-3GPP inter-working function (N3IWF) device is supported at the relay UE, wherein the sidelink relay access to the network entity flows at least from the relay UE to a radio access network (RAN), from the RAN to the N3IWF device, and from the N3IWF device to the network entity;
   determining that data is to be communicated between the remote UE and the network entity via the N3IWF device;
   sending a request to the relay UE to relay the data between remote UE and the network entity via the N3IWF device;
   receiving, from the relay UE, a response indicating that the sidelink relay access to the network entity via the N3IWF device is available; and
   communicating, through the relay UE, the data between the remote UE and the network entity via the N3IWF device when the sidelink relay access via the N3IWF device is available.

18. The method of claim 17, wherein the indication is included in a discovery message received from the relay UE.

19. The method of claim 18, wherein the indication comprises a value of at least one bit in the discovery message.

20. The method of claim 19, wherein the at least one bit is part of a bit field of a relay service code included in the discovery message.

21. The method of claim 17, wherein the request is a sidelink unicast link establishment request message.

22. The method of claim 21, wherein the response is a sidelink unicast link establishment response message that includes at least one of:
   a bit field having at least one bit set to a value to indicate an availability of the sidelink relay access via the N3IWF device; or
   an internet protocol (IP) address of the N3IWF device.

23. The method of claim 17, wherein the network entity is a 5G core network entity.

24. A remote user equipment (UE) for wireless communication, comprising:
   at least one processor;
   a transceiver communicatively coupled to the at least one processor; and
   a memory communicatively coupled to the at least one processor, wherein the at least one processor is configured to:
      receive an indication from a relay UE that sidelink relay access to a network entity via a non-3GPP inter-working function (N3IWF) device is supported at the relay UE, wherein the sidelink relay access to the network entity flows at least from the relay UE to a radio access network (RAN), from the RAN to the N3IWF device, and from the N3IWF device to the network entity, determine that data is to be communicated between the remote UE and the network entity via the N3IWF device, send a request to the relay UE to relay the data between remote UE and the network entity via the N3IWF device, receive, from the relay UE, a response indicating that the sidelink relay access to the network entity via the N3IWF device is available, and communicate, through the relay UE, the data between the remote UE and the network entity via the N3IWF device when the sidelink relay access via the N3IWF device is available.

25. The remote UE of claim 24, wherein the indication is included in a discovery message received from the relay UE.

26. The remote UE of claim 25, wherein the indication comprises a value of at least one bit in the discovery message.

27. The remote UE of claim 26, wherein the at least one bit is part of a bit field of a relay service code included in the discovery message.

28. The remote UE of claim 24, wherein the request is a sidelink unicast link establishment request message.

29. The remote UE of claim 28, wherein the response is a sidelink unicast link establishment response message that includes at least one of:

a bit field having at least one bit set to a value to indicate an availability of the sidelink relay access via the N3IWF device; or an internet protocol (IP) address of the N3IWF device.

30. The remote UE of claim 24, wherein the network entity is a 5G core network entity.

* * * * *